United States Patent Office 3,538,011
Patented Nov. 3, 1970

3,538,011
STABILIZED COMPOSITIONS CONTAINING ORGANIC PEROXIDES, AND METHODS FOR THE PRODUCTION THEREOF
Johannes Petrus van der Klaauw, Standdaarbuiten, Netherlands, assignor to N.V. Chefaro Maalschappij, Rotterdam, Netherlands, a corporation of the Netherlands
No Drawing. Filed Apr. 17, 1967, Ser. No. 631,158
Claims priority, application Netherlands, June 23, 1966, 6608705; Nov. 1, 1966, 6615380
Int. Cl. C07c 73/02; C08k 1/20
U.S. Cl. 252—186     8 Claims

ABSTRACT OF THE DISCLOSURE

An organic peroxide, for example, of the diacyl and alkylidene type, which is solid at room temperature and useful as a polymerization initiator, for example, in the curing of unsaturated polyester resin masses, is mixed with a substance, preferably acting as a plasticiser, and which is also solid at room temperature, inert with respect to the organic acid and soluble in polymerized polyester resin masses so as to reduce the explosiveness and shock-sensitivity of the organic peroxide in the resulting free-flowing powdery composition. The mixing may be effected by crystallizing the plasticiser from the molten state onto particles of the organic peroxide in a highly dilute suspension. Alternatively, the organic peroxide may be formed from organic and peroxide components in the presence of the plasticiser or in the presence of components which react to form the plasticiser so that production of the organic peroxide, or of the organic peroxide and the plasticiser, occurs simultaneously with the mixing operation.

---

The invention relates to a process for the manufacture of compositions of solid organic peroxides and desensitizing agents.

Organic peroxides, such as dibenzoyl peroxide, di-(p-chloro benzoyl) peroxide, di-(2.4.-dichlorobenzoyl) peroxide, cyclohexanone peroxide are used among others as polymerization initiators. These peroxides are seldom commercially available or used, as such due to their dangerous characteristics, that is, their high shock-sensitivity and explosiveness, but usually are available and used in the form of mixtures with an inert substance which acts as a desensitizing agent. By mixing with the inert substance the peroxide assumes a so-called "phlegmatisized" condition, which makes the handling of these rather explosive compounds almost harmless.

Various presently available commercial products contain, for instance, a rather large amount of water acting as a desensitizer. In the case of dibenzoyl peroxide, the proportion of water may be as much as 25%. For various polymerization processes, such as, for instance, the curing or hardening of unsaturated polyester resin masses, the presence of such large amounts of water is unacceptable so that the water containing products are simply unsuitable for these purposes.

Preparations are also known consisting of powdery mixtures containing 20 to 40% by weight of organic peroxides and the balance being made up of solid inorganic materials, such as gypsum, calcium phosphate, and the like. These mixtures are unsuitable for use in the manufacture of transparent polymers, as the filling materials are insoluble in the polymer and thus render the end product opaque.

Other known compositions consist of from 40 to 60% by weight or organic peroxide in liquid materials such as certain plasticisers, silicones and the like. These compositions are rather viscous pastes having little or no water content, and are wholly soluble in, for instance, unsaturated polyester masses. However, important disadvantages are involved in the handling and use of these pastes. The pastes may also separate into phases. Due to this fact and/or due to their viscous nature it is also difficult to measure the pastes accurately and to mix the same homogeneously with the mass to be polymerised, so that difficulties may arise in the polymerisation itself. Further, the use of pastes give rise to considerable losses, because quantities thereof always remain in the containers in which the pastes are transported and stored. This is also undesirable from the point of view of safety.

We have now found that it is possible to prepare peroxide compositions in powdery form containing in admixture, organic peroxide which is solid at room temperature, and a substance that is soluble in the polymerisation end-product and is solid at room temperature. These novel compositions have all the advantages of peroxide pastes, in that they are soluble in unsaturated polyester masses, without possessing the above mentioned disadvantages of the pastes, and they are very suitable for use in the cross-linking and polymerisation of unsaturated polyester resin masses.

It is a further object of the present invention to provide methods for the preparation of these novel peroxide compositions.

The substances to be mixed with organic peroxides in accordance with the present invention must meet the following requirements; they must be finely dividable substances and be solid at room temperature and thus preferably have a melting point which is above 40° C.; such melting point should preferably be below the decomposing temperature of the organic peroxide so as to afford a safer composition; they must be soluble in the polyester resin masses; and they must be inert with regard to the organic peroxides.

Preferred substances for use in accordance with the present invention are plasticisers. Suitable plasticisers are esters of phthalic acid, benzoic acid and phosphoric acid, such as, dicyclohexyl, phthalate, diphenyl phthalate, triphenyl phosphate, tri-p-toluyl phosphate, phenyl benzoate, p-tertiary-butyl-phenylbenzoate, alpha or beta-naphthyl benzoate, ethylene glycol dibenzoate, triethylene glycol dibenzoate, or trimethylene glycol dibenzoate; sulphonamides, such as, toluene sulphonamide and N-cyclohexyl p-toluene sulphonamide; and chlorinated paraffins obtained by chlorinating a mixture of paraffins and which have a chlorine content of at least 70%, by weight, so as to be solid at room temperatures (see: Kirk-Othmer's Encyclopedia of Chemical Technology (1953) vol. 10, page 770, and Table I, pages 786–787).

The foregoing plasticisers are all inert with respect to the organic peroxides, solid at room temperature and soluble in polyester resin masses, and have a melting point above 40° C. and below the decomposing temperature of the organic peroxides.

The organic peroxides that may be employed are unsubstituted and substituted aromatic and aliphatic diacyl peroxides, such as, dibenzoyl peroxide, di-(p-chlorobenzoyl) peroxide, di-(2-4-dichlorobenzoyl)peroxide, and acetyl benzoyl peroxide; ketone peroxides, such as bis(1-hydroxy-alkyl) peroxides, for example 1.1'-dihydroxydicyclohexyl peroxide; diketone peroxides, such as, 3.5-dimethyl 3.5-dihydroxy dioxolane-1.2 (obtained by reacting acetylacetone with hydrogen peroxide); peroxy esters of mono- and di-carboxylic acids, such as, mono-tertiary-butyl permaleate, and di-tertiary butyl diperphthalate; and alkylident type peroxides, such as, 1-hydroxy-1'-hydroperoxydicyclohexyl peroxide, and 1.1'-dihydroperoxydicyclohexyl peroxide; all of which organic peroxides are solid at room temperature.

The methods found to be suitable for the preparation of peroxide compositions according to the present invention can be roughtly divided into three classes:

(1) Mixing of the solid peroxide and the plasticiser in ways that are known per se.

(2) Production of the solid organic peroxide during the mixing procedure.

(3) Simultaneous production of the solid organic peroxide and the plasticiser during the mixing procedure.

METHODS IN CLASS 1

(a) The composition of the solid peroxide and the relevant plasticiser can, for instance, be obtained by thoroughly and carefully mixing the organic peroxide powder containing, for example, about 25% by weight of water, with the preferably powdery, if desired milled, solid plasticiser and thereafter drying the mixture. This drying can be effected in vacuo at a temperature below the softening point of the solid plasticiser, for example, below 40° C., or the mixture can be dried at atmospheric pressure and room temperature by inducing a flow of air over the mixture. Because of the looseness of the powdery mixture such drying can be accomplished very easily unlike the drying of pasty preparations.

(b) A preferred variation of this mixing procedure is a "coating" method. In this method, the finely divided solid organic peroxide is coated with the solid plasticiser, for instance, by introducing the molten plasticiser into a highly diluted suspension of the organic peroxide in water while stirring vigorously, whereafter the suspension is cooled down and stirred continuously until the plasticiser crystallizes on the peroxide particles. Preferably, the plasticiser is added to the aqueous suspension of the solid peroxide in the form of a solution thereof in an easily removable solvent. This method will be further illustrated in the examples.

METHODS IN CLASS 2

The composition can be obtained by synthesizing the organic peroxide in the presence of the plasticiser or by adding the plasticiser during the synthesis of the organic peroxide. Organic peroxides are usually prepared by reacting an organic substance with an inorganic substance which constitutes the peroxide component, for instance, hydrogen peroxide or sodium peroxide.

(a) If the organic substance is a liquid at room temperature, the plasticiser is preferably dissolved in this substance. The solution thus obtained is then added gradually to the inorganic substance or the latter is added to the solution. In this way a powdery solid composition is directly obtained consisting of an intimate admixture of organic peroxide and plasticiser and which only has to be filtered off and dried so as to be ready for use.

(b) If the organic raw material for the production of the organic peroxide is a solid substance at room temperature, such organic raw material is dissolved in an inert organic solvent, for instance, chloroform, and the plasticiser is also dissolved in an inert organic solvent, whereafter the solutions thus obtained are added to the inorganic peroxide component. In this case, the plasticiser is preferably dissolved in an inert organic solvent together with the solid organic raw material for the production of the organic peroxide, and the thus obtained solution is then added to the inorganic peroxide component, or the latter is added to the solution.

It has been found that all plasticisers suitable for use in mixtures according to the present invention are soluble, either in the organic raw materials for the production of the peroxides, if these raw materials are liquids at room temperature, or in the solutions in inert solvents of the organic raw materials for the production of the peroxides, if these raw materials are solids at room temperature.

Thus, the plasticisers mentioned above can be employed either dissolved in, for instance, benzoyl chloride, certain substituted benzoyl chlorides, cyclo hexanone and the like, or dissolved together with, for instance, dichlorobenzoyl chloride, in chloroform.

It has been found surprisingly that the production of the organic peroxide is not affected unfavorably by the presence of the plasticiser during the reaction. Neither the reaction time, nor the yield are substantially different from the reaction time or the yield in the absence of plasticiser. It will be clear, of course, that all the usual measures employed in normal manufacture of organic peroxides to enhance the yield and the purity of the peroxide, such as, for instance, the use of emulgators and/or the use of certain solvents, can also be employed in the methods in accordance with this invention.

METHODS IN CLASS 3

The organic peroxide and the plasticiser may be simultaneously synthesized, and this procedure is especially advantageous in those cases wherein the organic raw material for the organic peroxide is also a raw material for synthesis of the plasticiser. For example, a composition consisting of dibenzoyl peroxide and phenyl benzoate may be produced starting from benzoyl chloride, phenol and an inorganic peroxide. Other plasticisers that can also be synthesized simultaneously with the organic peroxide are, for example, p-tertiary-butyl phenyl benzoate, α-naphthyl benzoate, and β-napthyl benzoate.

Whichever of the above methods is used, the product obtained is a free-flowing powder consisting of an intimate admixture of organic peroxide and plasticiser and having the following advantages over the well-known pastes:

(1) The composition is measurable more easily and accurately and, if desired the measuring can be effected mechanically.

(2) Separation of the mixture into phases is not possible. Thus the dosing is always correct.

(3) Homogeneous mixing with the polyester resin mass can be accomplished more simply and faster (initial mixing with a small portion of the polyester resin, as recommended for pastes, is not necessary).

(4) Residues of the mixture do not remain in the shipping containers.

(5) The composition is safer in handling and storage. The heat evoluted at the start of decomposition is absorbed in the form of the latent heat of fusion of the plasticiser, so that the composition has a repressed shock and decomposition sensitivity.

(6) The composition has a lower bulk density, so that any local decomposition is transmitted more slowly and the local evolution of heat is smaller, giving rise to better fire resistance.

In principle, all ratios of solid peroxide and solid plasticisers can of course deliver free-flowing powders having all the above-mentioned advantages. However, from considerations of safety, proportions greater than 80% by weight of organic peroxide are preferably avoided, and the preferred proportion of the organic peroxide is in the range from about 40% to 75%, by weight.

It is clear that the invention is applicable, in principle, to all organic peroxides that are solid at room temperature, but, of course, the greatest advantage is achieved by applying the invention to those solid organic peroxides which are highly sensitive to shock and friction and/or are explosive in the dry state.

Of the methods generally described above, those coming within "Class 2" are preferred in that the resulting powders are finer than that obtained by the methods of "Class 1" and are more quickly soluble in polyester resins. Further, the powdery mixtures obtained by the methods of "Class 2" are more homogeneous and even safer to handle than those obtained by "Class 1" methods. The methods of "Class 3" are generally endowed with the foregoing advantages of the "Class 2" methods.

The following examples are given for the purpose of merely illustrating the present invention.

Example 1

A mixture of 60 g. of just molten dicyclohexyl phthalate and 10 g. of gasoline (boiling range 100 to 140° C.) is added as quickly as possible to a suspension of 60 g. of dibenzoyl peroxide, having a mean particle size of 100μ, in 200 cm.$^3$ of water, with vigorous stirring. After some minutes the plasticiser crystallizes out upon the crystals of dibenzoyl peroxide.

After filtering and drying, 120 g. are obtained of a powdery mixture containing approximately equal amounts by weight of dibenzoyl peroxide and dicyclohexyl phthalate.

Example 2

A mixture of 60 g. of just molten triphenyl phosphate and 20 g. chloroform is added as quickly as possible to a suspension of 60 g. of finely divided crystalline dibenzoyl peroxide in 200 cm.$^3$ water, with vigorous stirring. After crystallization of the plasticiser upon the dibenzoyl peroxide crystals the mixture is filtered and dried.

120 g. are obtained of a powdery mixture containing approximately equal amounts by weight of dibenzoyl peroxide and triphenyl phosphate.

Example 3

A mixture of 30 g. of just molten o/p-toluene-sulphonamide and 5 g. of gasoline (boiling range 100–140° C.) is added as quickly as possible to a suspension of 70 g. of 1-hydroxy-1'-hydroxydicyclohexylperoxide in 150 g. water, with vigorous stirring.

The plasticiser immediately crystallizes upon the finely divided crystalline organic peroxide, whereupon the mixture is filtered and dried.

100 g. are obtained of a powder mixture containing 70% by weight of 1-hydroxy-1'-hydroxydicyclohexylperoxide and 30% by weight of o/p-toluene sulphonamide.

Example 4

100 g. of water, 62.2 g. of caustic soda (50%) and 25.2 g. of hydrogen peroxide solution (50%) are mixed. To the thus obtained aqueous suspension of sodium peroxide, a solution of 80 g. of dicyclohexyl phthalate in 100 g. of benzoyl chloride is added dropwise with stirring, while maintaining the temperature between 0° and 5° C. After a few minutes a solid product crystallized out. This product is filtered, washed and dried. A free-flowing powder consisting of an intimate admixture of equal parts of dibenzoyl peroxide and dicyclohexyl phthalate is obtained. The powder is finer than that obtained according to the Examples 1–3 and is more quickly soluble in polyester resins.

Example 5

A solution of 27.4 g. of dicyclohexyl phthalate in 60 g. of cyclohexanone is added to a mixture of 111 g. of water and 10.3 g. of nitric acid (70%) and, thereafter, 44.1 g. of hydrogen peroxide (50%) is added with vigorous stirring. The temperature is maintained at 20° C. by external cooling. After the addition of the hydrogen peroxide, the reaction mixture is stirred for an hour. The product thus formed is filtered, washed acid-free and dried. A finely divided free-flowing powder consisting of an intimate admixture of 70% by weight of cyclohexanone peroxide (mainly consisting of 1-hydroxy-1'-hydroperoxy dicyclohexyl peroxide, and containing minor amounts 1-1'-dihydroxydicyclohexyl peroxide and 1-1'-dihydroperoxydicyclohexyl peroxide) and 30% by weight dicyclohexyl phthalate is obtained.

Example 6

25.2 g. of hydrogen peroxide solution (50%) and a solution of 38 g. of phenol in 156.8 g. of benzoyl chloride are sequentially added to an aqueous solution of caustic soda (50%), while stirring vigorously and maintaining the temperature in the range of 0° to 5° C.

After some time a product crystlalizes out, and such product is filtered, washed till it gives a neutral reaction and then dried.

160 g. are obtained of a solid, powdery, free-flowing product, containing about equal parts of di-benzoyl peroxide and phenyl benzoate.

Example 7

150 g. of water, 109.6 g. of caustic soda (50%), 25.2 g. of hydrogen peroxide solution (50%) and 18.4 g. ethylene glycol are mixed. To the thus obtained mixture, 183.2 g. of benzoyl chloride is added dropwise in about 90 minutes with stirring, while maintaining the temperature between 0° and 5° C.

The solid product formed is filtered, washed and dried. A free-flowing powder consisting of an intimate admixture of 58.6% by weight of dibenzoyl peroxide and 41.4% by weight of ethylene glycol dibenzoate is obtained.

Example 8

50 g. water, 31.1 g. of caustic soda (50%) and 12.6 g. of hydrogen peroxide solution (50%) are mixed. To the thus obtained aqueous suspension of sodium peroxide, a solution of 40 g. of a solid chloroparaffin (chlorine content 70%) in 50 g. of benzoylchloride is added dropwise with stirring, while maintaining the temperature between 0° and 5° C.

The solid product formed is filtered, washed and dried. A powdery, free-flowing product consisting of an intimate admixture of 49% by weight of dibenzoyl peroxide and 51% by weight of chloroparaffin is obtained.

Example 9

A mixture of 24 g. of diphenyl phthalate and 5 g. of chloroform is warmed until it is homogeneous. This solution is added with vigorous stirring to a suspension of 24 g. of di-tertiary-butyl di-perphthalate in 100 g. of water. The product formed is filtered and dried. A finely divided, free-flowing mixture containing equal amounts by weight of di - tertiary - butyl di - perphthalate and diphenyl phthalate is obtained.

Example 10

A solution of 75 g. of just molten tri-p-toluyl phosphate and 25 g. of chloroform is added as quickly as possible to a cool suspension of 75 g. of finely divided crystalline 3.5. - dimethyl - 3.5. - dihydroxy dioxalane-1.2. in isopropanol, with vigorous stirring. After crystallization of the plasticiser upon the peroxide crystals the mixture is filtered and dried.

A powdery mixture contained approximately equal amounts by weight of 3.5 - dimethyl-3.5 - dihydroxy dioxolane-1.2 and tri-p-toluyl phosphate is obtained.

What is claimed is:

1. A stabilized composition of reduced explosiveness and shock sensitivity consisting essentially of, in admixture, an organic peroxide which is selected from the group consisting of dibenzoyl peroxide, di(p-chloro benzoyl) peroxide, di(2 - 4 - dichlorobenzoyl peroxide, acetyl benzoyl peroxide, 1.1'dihydroxy dicyclohexyl peroxide, 1 - hydroxy 1' - hydroperoxy dicyclohexyl peroxide, 1.1' - dihydroperoxy dicyclohexyl peroxide, 3.5 - dimethyl 3.5 - dihydroxy dioxalane - 1.2., mono - tertiary-butyl permaleate, di - tertiary - butyl di - perphthalate and mixtures thereof, and a plasticiser having a melting point which is higher than 40° C. and which is below the decomposing temperature of said organic peroxide, said plasticiser being inert with respect to said peroxide and soluble in polymerized polyester resin masses, said plasticiser constituting from 20% to 60% by weight of said composition and being selected from the group consisting of dicyclohexyl phthalate, diphenyl phthalate, triphenyl phosphate, tri-p- toluyl phosphate, phenyl benzoate, p - tertiary - butylphenyl benzoate, α - naphthyl benzoate, β - naphthyl benzoate, N - cyclohexyl p - toluene sulphonamide, toluene sulphonamide, chlorinated paraffins containing at least 70%, by weight, of chlorine, ethylene glycol dibenzoate, triethylene glycol dibenzoate, trimethylene glycol dibenzoate, and mixtures thereof.

2. A method of reducing the explosiveness and shock-sensitivity of an organic peroxide which is selected from the group consisting of dibenzoyl peroxide, di(p-chloro benzoyl) peroxide, di(2 - 4 - dichlorobenzoyl) peroxide, acetyl benzoyl peroxide, 1.1'dihydroxy dicyclohexyl peroxide, 1 - hydrovy 1' - hydroperoxy dicyclohexyl peroxide, 1.1' - dihydroperoxy dicyclohexyl peroxide, 3.5 - dimethyl 3.5 - dihydroxy dioxolane - 1.2., mono - tertiary-butyl permaleate, di - tertiary - butyl di - perphthalate and mixtures thereof, comprising intimately mixing said organic peroxide, in finely divided form, with a plasticiser having a melting point which is higher than 40° C. and which is below the decomposing temperature of said organic peroxide, said plasticiser being inert with respect to said peroxide and soluble in polymerized polyester resin masses, the amount of said plasticiser being sufficient to constitute from 20% to 60%, by weight, of the mixture thereof said organic peroxide, and said plasticiser being selected from the group consisting of dicyclohexyl phthalate, diphenyl phthalate, triphenyl phosphate, tri-p-toluyl phosphate, phenyl benzoate, p-tertiary-butylphenyl benzoate, α - naphthyl benzoate, β - naphthyl benzoate, N - cyclohexyl p - toluene sulphonamide, toluene sulphonamide, chlorinated paraffins containing at least 70%, by weight, of chlorine, ethylene glycol dibenzoate, triethylene glycol dibenzoate, trimethylene glycol dibenzoate, and mixtures thereof.

3. The method according to claim 2, in which said plasticiser, in molten form, is added to an aqueous suspension of said organic peroxide with vigorous stirring, the mixture is cooled to cause said plasticiser to crystallize out on the particles of organic peroxide, and the product thus obtained is filtered, washed and dried.

4. The method according to claim 2, in which said organic peroxide is prepared in situ by reacting, by contact and agitation, an organic component thereof with a peroxide component selected from the group consisting of a aqueous hydrogen peroxide and aqueous sodium peroxide, in the presence of said plasticiser.

5. The method according to claim 2, in which said organic peroxide and said plasticiser are synthesized simultaneously during the mixing thereof by reacting, through contact and agitation, an organic component and peroxide component for said organic peroxide and, at the same time, reactants to form said plasticiser.

6. The method according to claim 2, in which said plasticiser is mixed with said organic peroxide in the form of a solution of said plasticiser in an easily removable solvent selected from the group consisting of gasoline and chloroform, and the mixture thus obtained is dried.

7. The method according to claim 4, in which said organic component is a solvent for said plasticiser and is selected from the group consisting of cyclohexanone and benzoylchloride, and said plasticiser is provided in the form of a solution thereof in said organic component.

8. The method according to claim 5, in which said organic component is benzoylchloride which also constitutes one of said reactants to form said plasticiser, and in which another of said reactants to form the plasticiser is provided in the form of a solution of said other reactant in said benzoylchloride.

References Cited

UNITED STATES PATENTS

| 2,453,071 | 11/1948 | Hyatt et al. | 252—186 |
| 2,454,254 | 11/1948 | Kuoch et al. | 252—186 |
| 2,458,207 | 1/1949 | Rudolph et al. | 260—610 |
| 2,927,084 | 3/1960 | Wahl | 252—186 |
| 3,324,040 | 6/1967 | Spoor | 252—186 |

LEON D. ROSDOL, Primary Examiner

I. GLUCK, Assistant Examiner

U.S. Cl. X.R.

252—187; 260—502, 610